United States Patent
Hardie et al.

(10) Patent No.: US 8,724,513 B2
(45) Date of Patent: May 13, 2014

(54) METHODS AND APPARATUS FOR DISTRIBUTION OF IP LAYER ROUTING INFORMATION IN PEER-TO-PEER OVERLAY NETWORKS

(75) Inventors: Edward T. L. Hardie, Menlo Park, CA (US); David Craig, San Diego, CA (US); Ranjith S. Jayaram, San Diego, CA (US); Ravish Khosla, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 712 days.

(21) Appl. No.: 12/567,544

(22) Filed: Sep. 25, 2009

(65) Prior Publication Data

US 2011/0075673 A1    Mar. 31, 2011

(51) Int. Cl.
H04L 12/28    (2006.01)
(52) U.S. Cl.
USPC .......................................... 370/255; 370/465
(58) Field of Classification Search
None
See application file for complete search history.

(56) References Cited

U.S. PATENT DOCUMENTS

| | | | |
|---|---|---|---|
| 7,209,978 | B2 | 4/2007 | Thubert et al. |
| 7,333,461 | B2 | 2/2008 | Thubert et al. |
| 8,126,477 | B2 | 2/2012 | Dravida et al. |
| 2006/0140177 | A1* | 6/2006 | Karhu ......................... 370/356 |
| 2006/0221921 | A1 | 10/2006 | Kniveton |
| 2007/0086458 | A1 | 4/2007 | Narayanan et al. |
| 2008/0117844 | A1 | 5/2008 | Thubert et al. |
| 2008/0291920 | A1 | 11/2008 | Serbest et al. |
| 2011/0075673 | A1* | 3/2011 | Hardie et al. ................. 370/401 |

FOREIGN PATENT DOCUMENTS

TW    200539617    12/2005

OTHER PUBLICATIONS

International Search Report and Written Opinion—PCT/US2010/050417, International Search Authority—European Patent Office—Dec. 16, 2010.
Juan Jose Adan Giss: "Tunneled Inter-domain Routing (TIDR) ; draft-adan-idr-tidr-01.txt", IETF Standard-Working-Draft, Internet Engineering Task Force, IETF, CH, No. 1, Nov. 1, 2006, XP015048742, pp. 1-16.
Thaler Internet Architecture Board D: "Multi-Link Subnet Issues; rfc4903.txt", IETF Standard, Internet Engineering Task Force, IETF, CH, Jun. 1, 2007, XP015052441, pp. 1-17.
Taiwan Search Report—TW099132383—TIPO—Sep. 2, 2013.

\* cited by examiner

*Primary Examiner* — Robert Wilson
(74) *Attorney, Agent, or Firm* — Kristine U. Ekwueme

(57) ABSTRACT

Methods and apparatus for distribution of IP layer routing information in peer-to-peer overlay networks. A method includes transmitting an advertisement to a first subnet advertising the accessibility of subnets and including unique subnet identifiers to disambiguate overlapping addresses, receiving a request from a network that includes the first subnet to communicate with a network that includes the second subnet, establishing a first tunnel with the second subnet and a second tunnel with the first subnet, and directing transmissions between the tunnels based on policy. An apparatus includes means for transmitting the advertisement, means for receiving a request, means for establishing the first tunnel with the second subnet and the second tunnel with the first subnet, and means for directing transmissions between the first and second tunnels based on policy information.

44 Claims, 7 Drawing Sheets

METHODS AND APPARATUS FOR DISTRIBUTION OF IP LAYER ROUTING INFORMATION IN PEER-TO-PEER OVERLAY NETWORKS

BACKGROUND

1. Field

The present application relates generally to the operation of overlay networks, and more particularly, to methods and apparatus for distribution of IP layer routing information in peer-to-peer overlay networks.

2. Background

A network in which member nodes obtain services in the absence of server-based infrastructure is referred to herein as a "peer-to-peer" overlay network. In a peer-to-peer overlay, peer nodes co-operate with each other both to provide services and to maintain the network. Peer-to-peer overlay networks can be built on top of an underlying network, such as a network utilizing the Internet Protocol (IP).

Peer-to-peer networks based on Distributed Hash Tables (DHTs) use a form of key-based routing in which keys are randomly determined by a hash function. This means that two nodes which are adjacent in a peer-to-peer overlay may be in unrelated IP networks, may be behind Network Address Translation (NAT) technology or firewalls, or may have otherwise impaired reachability. One way to improve the routing available in those conditions is to configure tunnels that interconnect portions of the IP layer topology. Once a tunnel has been configured or the preferred route determined however, the information on its availability or the preference must be distributed. One way to distribute the information is to configure a separate service or attempt to re-use IP-layer routing announcements (e.g. BGP, RIP or Proxy ARP). However, these techniques usually are administratively prohibited or the information may be inappropriately propagated.

There are several traditional approaches to solving the above stated problems. One technique provides network topology information associated with an ISP or enterprise to peer-to-peer clients so as to minimize network traversal during media distribution. Such a distribution mechanism is external to the peer-to-peer network, however, and uses a polling mechanism for updates.

Therefore, it would be desirable to have a simple cost effective mechanism that operates to allow communication between nodes of disjoint subnets.

SUMMARY

In one or more aspects, a Multi-link Subnet Interchange (MSI) system is provided that operates to provide communications across disjoint IP subnets and/or private IP subnets. In various aspects, a node participating in an overlay network which wishes to make available information about IP-layer reachability creates searchable resources within the overlay to describe a new route (e.g. tunnel end point) or new information about an existing route. If the DHT permits, this information may also be "published" or "announced" as available, so that other nodes are aware of it. Whether published or searchable within an overlay context, this information allows participating nodes to establish routes to nodes which would otherwise have been unreachable or to establish better routes thereby avoiding having to configure a separate service or attempting to re-use IP layer routing announcements.

In an aspect, a method is provided for providing communication between a first network and a second network. The method comprises transmitting an advertisement to a first subnet of the first network advertising the accessibility of a second subnet of the second network, wherein the first network is disjoint from the second network, wherein the advertisement includes an a second address and a second unique subnet identifier corresponding to the second subnet, wherein a first address and a first unique subnet identifier are associated with the first subnet, and wherein unique subnet identifiers disambiguate overlapping addresses. The method also comprises receiving a request from the first network to establish communications with the second network, wherein the request identifies the first address and the first unique subnet identifier corresponding to the first subnet and the second address and the second unique identifier corresponding to the second subnet. The method also comprises establishing a first tunnel between a provider node and the second subnet, establishing a second tunnel between the provider node and the first subnet, and directing, by the provider node, a transmission between the first tunnel and the second tunnel based on policy information which results in communication between the first network and the second network.

In an aspect, an apparatus is provided for providing communication between a first network and a second network. The apparatus comprises a transceiver configured to transmit an advertisement to a first subnet of the first network advertising the accessibility of a second subnet of the second network, wherein the first network is disjoint from the second network, wherein the advertisement includes an a second address and a second unique subnet identifier corresponding to the second subnet, wherein a first address and a first unique subnet identifier are associated with the first subnet, and wherein unique subnet identifiers disambiguate overlapping addresses. The transceiver is further configured to receive a request from the first network to establish communications with the second network, wherein the request identifies the first address and the first unique subnet identifier corresponding to the first subnet and the second address and the second unique identifier corresponding to the second subnet. The apparatus also comprises a processor configured to establish a first tunnel between a provider node and the second subnet, establish a second tunnel between the provider node and the first subnet, and direct, by the provider node, a transmission between the first tunnel and the second tunnel based on policy information which results in communication between the first network and the second network.

In an aspect, an apparatus is provided for providing communication between a first network and a second network. The apparatus comprises means for transmitting an advertisement to a first subnet of the first network advertising the accessibility of a second subnet of the second network, wherein the first network is disjoint from the second network, wherein the advertisement includes an a second address and a second unique subnet identifier corresponding to the second subnet, wherein a first address and a first unique subnet identifier are associated with the first subnet, and wherein unique subnet identifiers disambiguate overlapping addresses. The apparatus also comprises means for receiving a request from the first network to establish communications with the second network, wherein the request identifies the first address and the first unique subnet identifier corresponding to the first subnet and the second address and the second unique identifier corresponding to the second subnet. The apparatus also comprises means for establishing a first tunnel between a provider node and the second subnet, establishing a second tunnel between the provider node and the first subnet, and directing, by the provider node, a transmission between the first tunnel and the second tunnel based on policy information which results in communication between the first network and the second network.

In an aspect, a computer program product is provided for providing communication between a first network and a second network. The computer program product comprises a computer-readable medium embodying codes executable to transmit an advertisement to a first subnet of the first network advertising the accessibility of a second subnet of the second network, wherein the first network is disjoint from the second network, wherein the advertisement includes an a second address and a second unique subnet identifier corresponding to the second subnet, wherein a first address and a first unique subnet identifier are associated with the first subnet, and wherein unique subnet identifiers disambiguate overlapping addresses. The computer program product also embodies codes executable to receive a request from the first network to establish communications with the second network, wherein the request identifies the first address and the first unique subnet identifier corresponding to the first subnet and the second address and the second unique identifier corresponding to the second subnet. The computer program product also embodies codes executable to establish a first tunnel between a provider node and the second subnet, establish a second tunnel between the provider node and the first subnet, and direct, by the provider node, a transmission between the first tunnel and the second tunnel based on policy information which results in communication between the first network and the second network.

In an aspect, a method is provided for operating a first node to communicate with a disjoint network, wherein the first node is in at least one of a subnet and a peer-to-peer overlay network. The method comprises receiving an advertisement that advertises the accessibility of a second subnet, wherein the second network is disjoint to the first node, wherein the advertisement includes information identifying an address and a unique subnet identifier for the second subnet and information identifying a provider node, wherein unique subnet identifiers disambiguate overlapping addresses. The method also comprises identifying the second subnet for communications to a correspondent node, wherein the correspondent node includes the second subnet, and wherein the correspondent node is disjoint to the first node. The method also comprises transmitting a request to the provider node, wherein the request identifies the second subnet by the address and subnet identifier associated with the second node. The method also comprises establishing a tunnel to the provider node and communicating with the correspondent node using the tunnel based on policy information.

In an aspect, an apparatus is provided for operating a first node to communicate with a disjoint network, wherein the first node is in at least one of a subnet and a peer-to-peer overlay network. The apparatus comprises means for receiving an advertisement that advertises the accessibility of a second subnet, wherein the second network is disjoint to the first node, wherein the advertisement includes information identifying an address and a unique subnet identifier for the second subnet and information identifying a provider node, wherein unique subnet identifiers disambiguate overlapping addresses. The apparatus also comprises means for identifying the second subnet for communications to a correspondent node, wherein the correspondent node includes the second subnet, and wherein the correspondent node is disjoint to the first node. The apparatus also comprises means for transmitting a request to the provider node, wherein the request identifies the second subnet by the address and subnet identifier associated with the second node. The apparatus also comprises means for establishing a tunnel to the provider node and communicating with the correspondent node using the tunnel based on policy information.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein.

DESCRIPTION

The following description describes aspects of a MSI system that operates to provide communications across disjoint IP subnets. IP subnets are disjoint when it is not possible to route datagrams between them because they have an overlapping address space or other address ambiguities. Disjoint subnets may arise from using different link-layer technologies like Wi-Fi and Ethernet, Virtual Private Networks (VPNs) or NAT technology.

Figure 1:
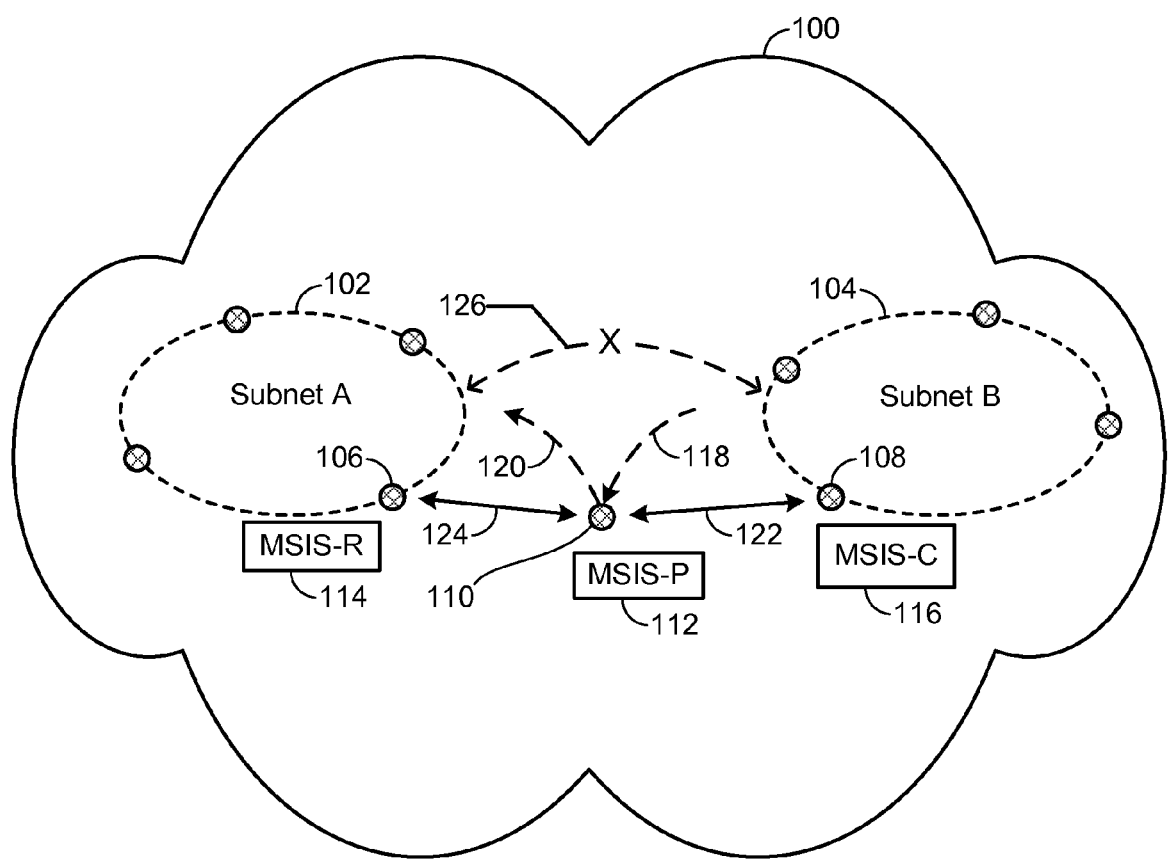
FIG. 1 shows a network that illustrates aspects of a MSI system.

FIG. 1 shows a network 100 that illustrates aspects of a MSI system. The network 100 comprises an Internet Protocol network. Although the network 100 is shown as a single entity, the network 100 may comprises any number or types of networks such as WANs, LANs, wireless networks or any other type of network.

The network 100 comprises subnet A 102 and subnet B 104, which are disjoint subnets. For example, the nodes of subnet A are not reachable by the nodes of subnet B, and vice versa, which is indicated by the arc 126. Each subnet may comprise one or more peer-to-peer overlay networks that include a subset of nodes of the network 100. For example, node 106 is configured for communications in a disjoint network that comprises subnet A. Similarly, node 108 is configured for communications on a disjoint network that comprises subnet B. Node 110 also operates on the network 100 and is configured for communications with both subnet A and subnet B.

As part of the MSI system, the node 110 comprises MSI system provider (MSIS-P) 112, which has multiple and simultaneously usable interfaces allowing it to communicate with multiple subnets. For example, the MSIS-P 112 comprises interfaces allowing simultaneous communication with subnets A and B. In another part of the MSI system, the node 106 comprises MSI system requestor (MSIS-R) 114 that is configured to allow the node 106 to request the services of the MSIS-P 112 to communicate with nodes of disjoint subnets. In addition, the node 108 comprises MSI system correspondent (MSIS-C) 116 that is configured to allow the node 106 to receive the services of the MSIS-P 112 to communicate with nodes of disjoint subnets. It should also be noted that a node may have both the MSIS-R 114 and MSIS-C 116 and that the MSIS-R 114 and MSIS-C 116 may also be combined into a single logical unit. Thus, for the purpose of this description, the node 106 will be referred to as comprising the MSIS-R 114 but it should also be noted that the node 106 may also comprise the MSIS-C 116. The same is true of node 108.

In various aspects, the MSI system operates to tunnel and forward packets between disjoint subnets to increase reachability and increase network access. To do this, the MSI system allows nodes in one subnet to learn of overlays in MSIS-reachable subnets and subsequently join those overlays.

The MSI system comprises a protocol for interaction between the MSIS-R 114, MSIS-P 112, and MSIS-C 116. This protocol comprises two parts, namely; MSIS Advertisement protocol and MSIS Tunneling protocol. The MSIS-P 112 uses the MSIS Advertisement protocol to advertise its capabilities to enable nodes to join overlays in disjoint subnets. The MSIS-P 112 uses the MSIS Tunneling protocol to establish tunnels to encapsulate the datagrams communicated between nodes of disjoint networks.

Example of MSIS Operation

The following is an example illustrating the operation of the MSIS-P 112 to utilize the advertising and tunneling protocols to provide operations of the MSI system.

It will be assumed that the MSIS-P 112 is coupled to communicate with nodes of the two subnets (A and B). It will further be assumed that the node 106 of subnet A wants to join an overlay network on subnet B. The interface addresses of MSIS-P 112 on the subnets A and B are MSIS-P-AddrA and MSIS-P-AddrB, respectively.

Obtaining Subnet Identifiers

The MSIS-P 112 operates to obtain subnet identifiers and maintain a database comprising the subnet identifier information. For example, the MSIS-P 112 listens for any possible MSIS advertisements (as indicated at 118) received through any of its interfaces before using its interfaces to transmit its own advertisements. This ensures that multiple MSIS-Ps will likely name each available subnet with the same overlay subnet identifier (OverlaySubnetId). Hence, these identifiers are universally unique identifiers. It should also be noted that it is possible for the same subnet to be assigned different OverlaySubnetIds by different MSIS-Ps. It is also possible to have multiple overlays in the same subnet as well as overlays spanning multiple subnets.

The MSI system operates so that the IP addresses used in the MSIS protocol will be disambiguated by the subnet identifiers. For example, the MSIS-P 112 can identify an IP address of a node in subnet B as OverlaySubnetB:IPX and advertise it on subnet A through MSIS-P-AddrA. Nodes in subnet A can then contact MSIS-P-AddrA to communicate with OverlaySubnetB:IPX. These overlay subnet identifiers represent two subnets from the point of view of the MSIS-P 112, but are in the context of the overlays that span all of network 100. These identifiers can equivalently be called subnet disambiguating identifiers. An overlay identifier or a concatenation of the overlay identifiers can also be used as a disambiguating identifier. The MSI system addresses the fact that multiple subnets having conflicting IP addresses may exist. Therefore, the disambiguation is used to route packets correctly. In an aspect, the MSIS-P 112 operates to assign the identifiers. However, the system may be extended so that another entity, which provides services across subnets, operates to provide the overlay subnet identifiers through advertisements. Regardless of which entity does the assignment, data structures and fields are defined to store overlay subnet identifiers along with IP addresses.

In the MSI system, GRE tunneling is used for encapsulating packets intended for transmission between subnets sent through the MSIS-P 112. Setting up the GRE tunnel requires a tunnel setup mechanism. Policy routing is used after the tunnel setup mechanism so that a combination of the incoming GRE interface and the destination IP address can be used to determine the outgoing GRE interface. The state associated with the interface is created by a tunnel setup protocol performed by the MSIS-P 112.

The MSIS system described herein is in the context of overlays, since the MSIS-R 114 joins various overlays through MSIS-P 112. However, the system can easily be extended to provide services through MSIS-P 112, whereby the MSIS advertisement contains information about the services available on overlay subnet B and a node (MSIS-C 116) which provides the services. The MSIS-R 114 can request MSIS-P 112 to form a tunnel to communicate with MSIS-C 116 and thereby use the services offered by MSIS-C 116.

MSIS Advertisement

The MSIS-P 112 starts by advertising (as indicated at 120) the availability of overlays and the services it can provide from one disjoint subnet to the other. If the MSIS-P 112 is not implementing any startup mechanism, it can send an AdvertiseMSIS messages periodically at an interval called Minimum Advertisement Time Window. This parameter is configurable and may typically have an upper bound of fifteen seconds. The format of the advertisements is provided in another section of this document.

The AdvertiseMSIS messages contain an overlay description list (OverlayDescriptionList) data structure as the payload, which contains overlay description data structures. The overlays whose descriptions are being sent will be all of (or a subset of) the overlays in a Known Overlay Table for the subnet which is being made reachable. There may also be an additional requirement on each overlay description data structure to have either the fields of an Enrollment Server or the Bootstrap peers present.

The MSIS-P 112 advertises even if the OverlayDescriptionList is empty, so that the nodes on each of the subnets it is connected to are informed of their respective overlay subnet identifiers. For example, the MSIS-P 112 sends out the AdvertiseMSIS messages as illustrated at 120. The AdvertiseMSIS messages also contain the OverlaySubnetId qualified IP address of MSIS-P's interface at which it should be contacted to contact the advertised overlays through it. This serves the purpose of communicating the subnet identifier to the MSIS-R 114. For example, if the AdvertiseMSIS message 120 contains OverlaySubnetA:MSIS-P-AddrA, then OverlaySubnetA is the subnet identifier of the subnet in which MSIS-R 114 belongs. The MSIS-R 114 then knows it does not need to use MSI to connect to another address it learns from an overlay that resides in OverlaySubnetA.

Before sending a MSIS Advertisement through an interface, the MSIS-P 112 listens for some random time, at least for 15 seconds (upper bound of Minimum Advertisement Time Window). If it hears of other MSIS Advertisements (i.e., 118) that name the subnet that the interface is connected to as some OverlaySubnetId, it chooses the same OverlaySubnetId for the subnet on which the advertisement is being sent out. If it doesn't hear any Advertisement, it randomly generates an OverlaySubnetId (which in one implementation is at least 128 bits long to ensure virtually no conflicts) and uses that as the subnet identifier. For example, the subnet identifiers are generated in accordance with ISO/IEC 11578:1996. The same mechanism is used to name the subnet that is being made reachable. The uniqueness of the identifiers is used for communicating unambiguously to nodes on the other subnet.

On receipt of a MSIS Advertisement, the information from the message is also used to create entries in a Known Overlay Table. This is similar to the action taken on receipt of an Overlay Advertisement. The only difference is that in the case of MSIS Advertisement, the Advertiser_Address in the Known Overlay Element is filled using a third field (OverlaySubnetA:MSIS-P-AddrA) of the message as described in another section below.

MSIS Tunneling

The MSIS Tunneling protocol presented here provides for GRE tunnels to be formed to route packets into disjoint networks. There is a tunnel setup and refresh protocol that is used by the MSIS-R 114 to setup and maintain tunnels.

One of the goals of the MSI system is to provide packet forwarding without support from the connectivity layer of the protocol stack. The connectivity layer is the layer containing tunneling support and is involved in the tunnel formation process. This immediately precludes the use of IP-IP tunneling since same the IP addresses in different subnets cannot be disambiguated. In an aspect, GRE is used as the tunneling mechanism so that virtual interfaces can be created in conjunction with OverlaySubnetId's to provide enough information in the routing table for correct packet forwarding. To achieve this goal, the MSIS-P 112 maintains policy routing state in its IP routing table. Although the MSIS-P 112 operates to forward packets from one subnet to the other, it is much more than a router since it makes disjoint subnets reachable at a higher level by providing access to services through overlays.

The MSIS-R 114 requests GRE tunnels to communicate with MSIS-C 116 through MSIS-P 112. Specifically, the connectivity layer initiates tunnel formation whenever any communication is initiated with an OverlaySubnetId qualified IP address. This results in creation of a first tunnel 122 between the MSIS-P 112 and the MSIS-C 116 and a second tunnel 124 between the MSIS-R 114 and the MSIS-P 112. The tunnels are maintained using Tunnel Refresh messages sent by MSIS-R 114 which refresh the two GRE tunnels (122, 124) together.

In an aspect, the Connection Table is modified at the connectivity layer to include an additional field called tunnel identifier (TunId). This is an index to an additional data structure called the TunnelTable maintained by the connectivity layer. Every GRE tunnel maintained at a node will be assigned a Tunnel Identifier and every connection will be associated with a TunId. For the connections that do not use GRE tunnels, the TunId will be 'invalid' (for example, a value of 0). 'Valid' TunId's will be assigned locally from a pool of TunId's, presumably non-zero natural numbers.

In an aspect the system provides a way to create a connection identifier (ConnectionId). A call CreateConnection( ) is provided, which in its simplest form will choose a ConnectionId from a pool of available identifiers and return the ConnectionId while creating a new entry in its ConnectionTable and initializing the TunId to 0 or the 'invalid value'. This API can be modified as CreateConnection(TunId) which would insert the TunId supplied as an argument into the corresponding field in the ConnectionTable when it creates an entry for the connection.

After MSIS-R 114 joins the Overlay and wishes to make connections with other nodes in the overlay, it utilizes any suitable rendezvous mechanism, such as ICE. The ambiguity of IP addresses causes ICE candidates to be ambiguous. To avoid this, the MSIS-R 114 adds another 'tunneled' ICE candidate OverlaySubnetIdA:MSIS-R-AddrA to its ICE candidates list. The tunneled candidate uses the overlay subnet identifier of the subnet to which MSIS-R-AddrA belongs. The node still uses the host candidate and assigns it a higher priority than the tunneled candidate. This ensures that if a direct connection to a node is available, it would be used first rather than going through the MSIS-P 112. It is also worth noting that even if the MSIS-C's 116 IP exists in OverlaySubnetA when MSIS-R 114 does ICE checks on the host candidate, the ICE checks will not succeed as the node with MSIS-C's 116 IP won't have a valid fingerprint (nonce) attribute. Whenever ICE connectivity checks happen at node B to a Tunneled Candidate, say OverlaySubnetIdX:NodeY, node B sends a request to the MSIS-P 112 for a tunnel to OverlaySubnetIdX:NodeY using the tunnel formation mechanism explained below. The MSIS-P 112 is the one that had advertised the OverlaySubnetIdX as a subnet which it can make reachable and this information can be found by looking up the Known Overlay Table. The tunnel once formed is used for connectivity checks which should succeed if no errors have been encountered in the tunnel formation process.

Thus, the MSI system operates to provide communications across disjoint IP subnets, thereby providing a means for packets from nodes in one subnet to reach nodes in a disjoint subnet in an easy and efficient manner.

Figure 2:
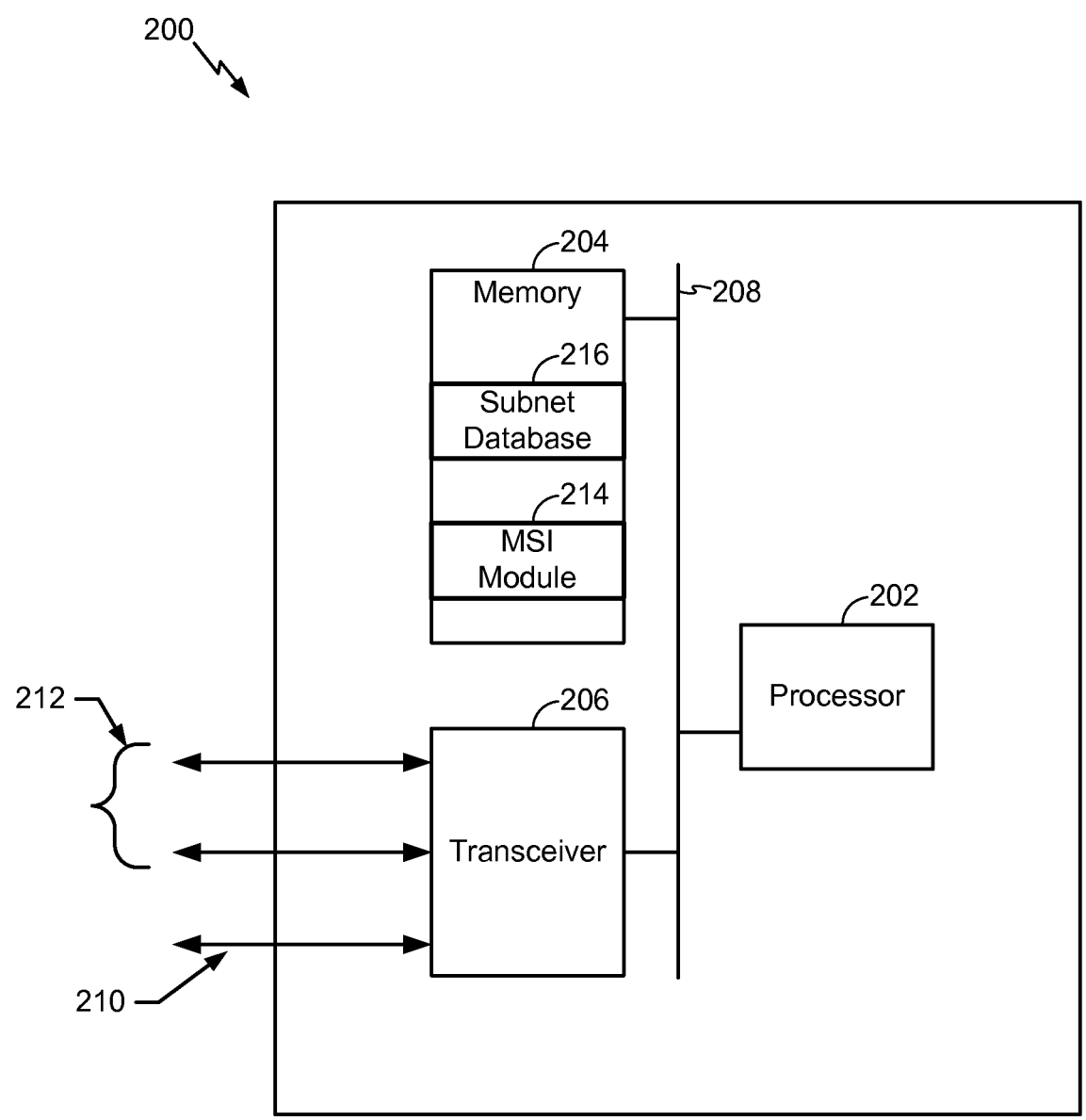
FIG. 2 shows an exemplary MSIS-P for use at a node in aspects of a MSI system.

FIG. 2 shows an exemplary MSIS-P 200 for use at a node in aspects of a MSI system. For example, the MSIS-P 200 is suitable for use as the MSIS-P 112 shown in FIG. 1. The MSIS-P 200 comprises processor 202, memory 204, and transceiver 206 all coupled to communicate over data bus 208. It should be noted that the MSIS-P 200 is just one implementation and that other implementations are possible.

The transceiver 206 comprises hardware and/or hardware executing software that operates to allow the MSIS-P 200 to receive advertisements or other information about available subnets on a first communication channel 210. For example, the first communication channel 210 may be a WLAN channel that allows the MSIS-P 200 to receive advertisement about available subnets on an IP network. The advertisement may include universally unique subnet identifiers.

The transceiver 206 also comprises hardware and/or hardware executing software that operates to provide a plurality of interfaces 212 over which the MSIS-P 200 can communicate with a plurality of subnets. For example, the transceiver 206 utilizes the interfaces 212 to communicate with the subnets using WiFi, Bluetooth, cellular transmission or any other type of communication technology. In an aspect, the transceiver 206 is operable to transmit advertisements to various subnets and receive messaging from the various subnets utilizing the interfaces 212. The interfaces 212 are operable further to provide tunnels between the transceiver 206 and the various subnets. For example, the tunnels may be GRE tunnels or other suitable types of tunnels.

The memory 204 comprises any suitable storage device operable to store a subnet database 216 comprising information identifying and/or associated with one or more subnets that the MSIS-P 200 is aware of.

The memory 204 also comprises MSI module 214 which comprises one or more modules comprising instructions or codes executable by the processor 202 to provide the functions of the MSI system described herein.

The processor 202 comprises at least one of a CPU, processor, gate array, hardware logic, memory elements, and/or hardware executing software. In an aspect, the processor 202 operates to execute instructions of the MSI module 214 to control the MSIS-P 200 to perform the functions of the MSI system described herein. A more detailed description of the operation of the MSIS-P 200 is provided in other sections of this document.

During operation the MSIS-P 200 performs one or more of the following functions.

1. Identify subnets (i.e., receive advertisements through channel 210).
2. Generate disambiguating subnet identifiers associated with each subnet.
3. Generate advertisements identifying known subnets and their associated subnet identifiers.
4. Transmit advertisements to subnets (using interfaces 212)
5. Receive requests to form tunnels between nodes of disjoint subnets (using interfaces 212).
6. Establish the requested tunnels (using interfaces 212).
7. Setup policy associated with the requested tunnels.
8. Receive and forward packets between tunnels based on the policy.

In an aspect, the MSI system comprises a computer program product having one or more program instructions ("instructions") or sets of "codes" stored or embodied on a machine-readable medium. When the codes are executed by at least one processor, for instance, the processor 202, their execution causes the MSIS-P 200 to provide the functions of the MSI system described herein. For example, the machine-readable medium comprises a floppy disk, CDROM, memory card, FLASH memory device, RAM, ROM, or any other type of memory device or machine-readable medium that interfaces to the MSIS-P 200. In another aspect, the sets of codes may be downloaded into the MSIS-P 200 from an external device or communication network resource. The sets of codes, when executed, operate to provide the functions of a MSI system as described herein.

Figure 3:
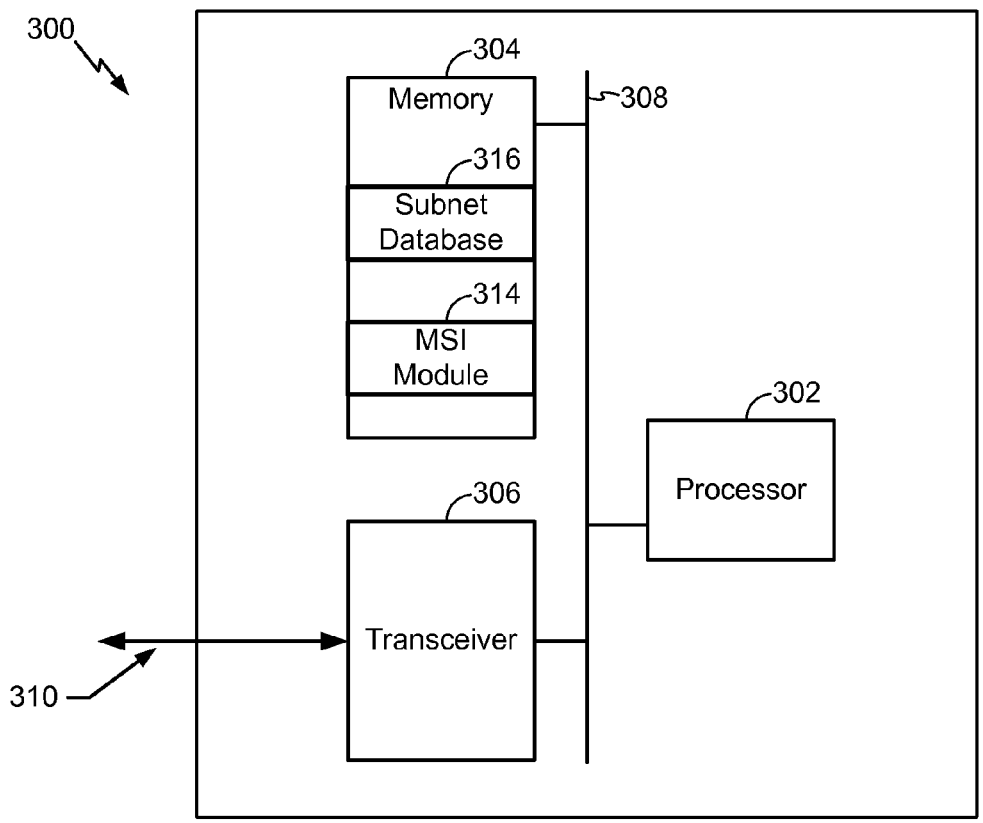
FIG. 3 shows an exemplary MSIS-R for use at a node in aspects of a MSI system.

FIG. 3 shows an exemplary MSIS-R 300 for use at a node in aspects of a MSI system. For example, the MSIS-R 300 is suitable for use as the MSIS-R 114 shown in FIG. 1. The MSIS-R 300 comprises processor 302, memory 304, and transceiver 306 all coupled to communicate over data bus 308. It should be noted that the MSIS-R 300 is just one implementation and that other implementations are possible.

The transceiver 306 comprises hardware and/or hardware executing software that operates to allow the MSIS-R 300 to receive advertisements or other information about available subnets on a first communication channel 310. For example, the first communication channel 310 may be a WLAN channel that allows the MSIS-R 300 to receive advertisement about available subnets on an IP network.

The transceiver 306 also utilizes the communication channel 310 to communicate with a host on a disjoint subnet. For example, the transceiver 306 utilizes the communication channel 310 to communicate with the disjoint subnet using a tunnel between the transceiver 306 and a host comprising MSIS-P, such as the MSIS-P 200 shown in FIG. 2. The tunnel may be a GRE tunnel or other suitable type of tunnel.

The memory 304 comprises any suitable storage device operable to store a subnet database 312 comprising information identifying and/or associated with one or more subnets that the MSIS-R 300 is aware of For example, the MSIS-R 300 may receive advertisements over the channel 310 that provide information about available subnets.

The memory 304 also comprises MSI module 314 which comprises one or more modules comprising instructions or codes executable by the processor 302 to provide the functions of the MSI system described herein.

The processor 302 comprises at least one of a CPU, processor, gate array, hardware logic, memory elements, and/or hardware executing software. In an aspect, the processor 302 operates to execute instructions of the MSI module 314 to control the MSIS-R 300 to perform the functions of the MSI system described herein. A more detailed description of the operation of the MSIS-R 300 is provided in other sections of this document.

During operation the MSIS-R 300 performs one or more of the following functions.

1. Receive advertisements from MSIS-P identifying disjoint subnets and associated disambiguating identifiers (through channel 310).
2. Identify a selected subnet to which communication is desired.
4. Transmit request to MSIS-P to establish tunnel to the selected subnet (using channel 310)
4. Receive indication that the requested tunnel has been established (using channel 310).
5. Set up policy for tunnel use.
6. Communicate with the selected subnet using the tunnel based on the policy.

In an aspect, the MSI system comprises a computer program product having one or more program instructions ("instructions") or sets of "codes" stored or embodied on a machine-readable medium. When the codes are executed by at least one processor, for instance, the processor 302, their execution causes the MSIS-R 300 to provide the functions of the MSI system described herein. For example, the machine-readable medium comprises a floppy disk, CDROM, memory card, FLASH memory device, RAM, ROM, or any other type of memory device or machine-readable medium that interfaces to the MSIS-R 300. In another aspect, the sets of codes may be downloaded into the MSIS-R 300 from an external device or communication network resource. The sets of codes, when executed, operate to provide the functions of a MSI system as described herein.

MSI System Messages

The following is a description of message types used in various aspects of the MSI system. For example, the messages types described below are transmitted between the MSIS-R 114, MSIS-P 112 and MSIS-C 116 shown in FIG. 1 to provide the various aspects of the MSI system. It should be noted that the message list described below is not exhaustive and that additional messages types may be used. It should also be noted that the described message may be suitably modified to comprise more or less parameters within the scope of the various aspects.

AdvertiseMSIS( ) Message

AdvertiseMSIS messages are sent by MSIS-P 112 to advertise the availability of subnets, overlays and services that it can provide access to. For example, an AdvertisMSIS message is sent to the MSIS_R 114 and has the following fields.

1. TunMechanism: The Tunneling Mechanism that will be used for a requestor (i.e., MSIS-R 114) to exchange messages with nodes in other subnet through MSIS-P 112. In this description, GRE is used as the tunneling mechanism.
2. OverlayDescriptionList: This contains multiple OverlayDescription data structures which describe the overlays and services available on Subnets that MSIS-P 112 knows about (i.e., subnet B). One implementation is that each OverlayDescription data structure should have either an Enrollment Server or a Bootstrap peer present. This field can be empty if no overlays are present on one of the subnets to which MSIS-P 112 is connected.

3. OverlaySubnetA:MSIS-P-AddrA: This is the IP address and port of MSIS-P 112 on subnet A. To use the MSI system and contact nodes in a disjoint overlay, MSIS-R 114 should contact MSIS-P-AddrA. The address is also qualified with the subnet identifier OverlaySubnetA. This identifier will be used by the nodes which hear this Advertisement to infer that they are in OverlaySubnetA as advertised by MSIS-P 112.

RequestTunnel( ) Message

A RequestTunnel message is sent by a requestor (i.e., MSIS-R 114) to an MSIS-P (i.e., MSIS-P 112) that prompts the MSIS-P 112 to initiate tunnel formation with another node (Secondary Requestee) and create a tunnel between the MSIS-R 114 and MSIS-P 112 if none exists. The message has the following fields.

1. OverlaySubnetId:RequestorAddress: This is the source address of the message, for example OverlaySubnetA: MSIS-R-AddrA.
2. OverlaySubnetId:RequesteeAddress: This is the destination address of the message, for example OverlaySubnetA: MSIS-P-AddrA.
3. OverlaySubnetId:SecondaryRequesteeAddress: This field gives information about the node to which the Requestee Node should establish a tunnel. The IP address of the 'tunnel destination' should be qualified with a disambiguating overlay subnet identifier, i.e., OverlaySubnetId.
4. Options: This field indicates possible options that can be included for the tunnel formation. For example, it can include authentication information that would enable the Requestee to verify if the sender of this message is authorized to request setting up the tunnel.

TunnelGranted( ) Message

A TunnelGranted message is sent by MSIS-P 112 to MSIS-R 114 in response to the RequestTunnel message. This message is sent after MSIS-P 112 has created a tunnel with OverlaySubnetId: SecondaryRequesteeAddress.

1. OverlaySubnetId:RequestorAddress: This is the address of the node which requested the tunnel and hence the destination address of the message. For example, this field can be OverlaySubnetA:MSIS-R-AddrA.
2. OverlaySubnetId:RequesteeAddress: This is the address of the node which granted the tunnel request and hence is the source address of the message. For example, this field can be OverlaySubnetB:MSIS-P-AddrA.
3. OverlaySubnetId: SecondaryRequesteeAddress: This will be the end node with which the Requestee has set up a tunnel. For example, this can be the Bootstrap peer (BP).
4. TunnelIdentifyingInfo: This field contains some identifying information about the tunnel between the Requestor and the Requestee so that the Requestor can setup this tunnel at its end. The tunnel between the Requestor and Requestee may be preexisting or may be granted by this message. The identifying information can be the GRE key. The GRE key to be selected for a new tunnel may be predetermined or chosen randomly by the Requestee and sent to the Requestor.
5. Options: This field indicates possible options that can be included for the tunnel formation. This may be some authentication related information.

RequestGRETunnel( ) Message

A RequestGRETunnel message sent from a source node to a destination node explicitly requests a GRE Tunnel to be setup between the two nodes. For example, the MSIS-P 112 sends the message to the MSIS-C 116 to request formation of a GRE tunnel. The message has the following fields.

1. OverlaySubnetId:RequestorAddress: This is the address of the node which requested the tunnel and the source address of the message.
2. OverlaySubnetId:RequesteeAddress: This is the address of the node which is being requested to create the tunnel and the destination address of the message.
3. OverlaySubnetId:OnBehalfofAddress: This is the address of the node on behalf of which this RequestGRETunnel message is being sent, i.e. this is the address of the node which will be sending packets to OverlaySubnetId:DestinationAddress using this GRE tunnel if the setup completes successfully. Sending this address in the message also sends the UniqueOverlaySubnetId implicitly.
4. Options: This field indicates possible options that can be included for the tunnel formation. For example, it can include authentication information that would enable the Requestee to verify if the sender of this message is authorized to request setting up the tunnel.

GRETunnelGranted( ) Message

A GRETunnelGranted message is sent from a node in response to RequestGRETunnel message if it agrees to setup a GRE tunnel. For example, the MSIS-C 116 sends the message to the MSIS-P 112 granting the formation of a GRE tunnel. The message has the following fields.

1. OverlaySubnetId:RequestorAddress: This is the address of the node which requested the tunnel and hence the destination address of the message.
2. OverlaySubnetId:RequesteeAddress: This is the address of the node which granted the tunnel request and hence is the source address of the message.
3. OverlaySubnetId:OnBehalfofAddress: This is the address of the node on behalf of which this tunnel was requested by OverlaySubnetId:RequestorAddress. This field is copied from the corresponding field in the RequestGRETunnel message. This also sends the UniqueOverlaySubnetId implicitly to the Requestor.
4. TunnelIdentifyingInfo: This field contains some identifying information about the tunnel between the Requestor and the Requestee so that the Requestor can setup this tunnel at its end. The identifying information can be the GRE key. The GRE key to be selected for a new tunnel may be predetermined or chosen randomly by the Requestee and sent to the Requestor.
5. Options: This field indicates possible options that can be included for the tunnel formation acknowledgment. For example, it can include authentication related information.

TunnelRefresh( ) Message

TunnelRefresh Messages are sent by MSIS-R 114 to refresh the tunnels that have been formed using RequestTunnel message. This directly causes the tunnel between MSIS-R 114 and MSIS-P 112 to be refreshed. It also leads to the refresh of the tunnel between MSIS-P 112 and MSIS-C 116 indirectly when MSIS-P 112 sends GRETunnelRefresh Message. The message has the following fields.

1. OverlaySubnetId:RequestorAddress: This is the source address of the message. For example, this field can be OverlaySubnetA:MSIS-R-AddrA.
2. OverlaySubnetId:RequesteeAddress: This is the destination address of the message. For example, this field can be OverlaySubnetA:MSIS-P-AddrA.
3. OverlaySubnetId:SecondaryRequesteeAddress: This field gives information about the node with which the Requestee Node has have a tunnel with. The IP address of the 'tunnel destination' should be qualified with a disambiguating overlay subnet identifier, OverlaySubnetId.
4. Options: This field indicates possible options that can be included for the tunnel formation. For example, it can include authentication information that would enable the Requestee to verify if the sender of this message is authorized to send the refresh messages.

GRETunnelRefresh( ) Message

A GRETunnelRefresh message is sent by a MSIS-P 112 when it receives a TunnelRefresh message from MSIS-R 114. This message refreshes the tunnel that was formed between MSIS-P 112 and MSIS-C 116. The message has the following fields.

1. OverlaySubnetId:RequestorAddress: This is the source address of the message.
2. OverlaySubnetId:RequesteeAddress: This is the destination address of the message.
3. OverlaySubnetId:OnBehalfofAddress: This is the address of the node on behalf of which this GRE Tunnel Refresh message is being sent. Sending this address in the message also sends the UniqueOverlaySubnetId implicitly.
4. Options: This field indicates possible options that can be included for the tunnel formation. For example, it can include authentication information that would enable the Requestee to verify if the sender of this message is authorized to send the refresh messages.

Call Flow

This section describes the call flow for calls utilizing the MSI system to provide for tunnel formation. If the functionality to connect to any node in an overlay is successfully implemented, then other overlay functions like putting/getting data from the overlay and maintaining fingers can proceed as usual using overlay routing.

AdvertiseMSIS Messaging

Figure 4:
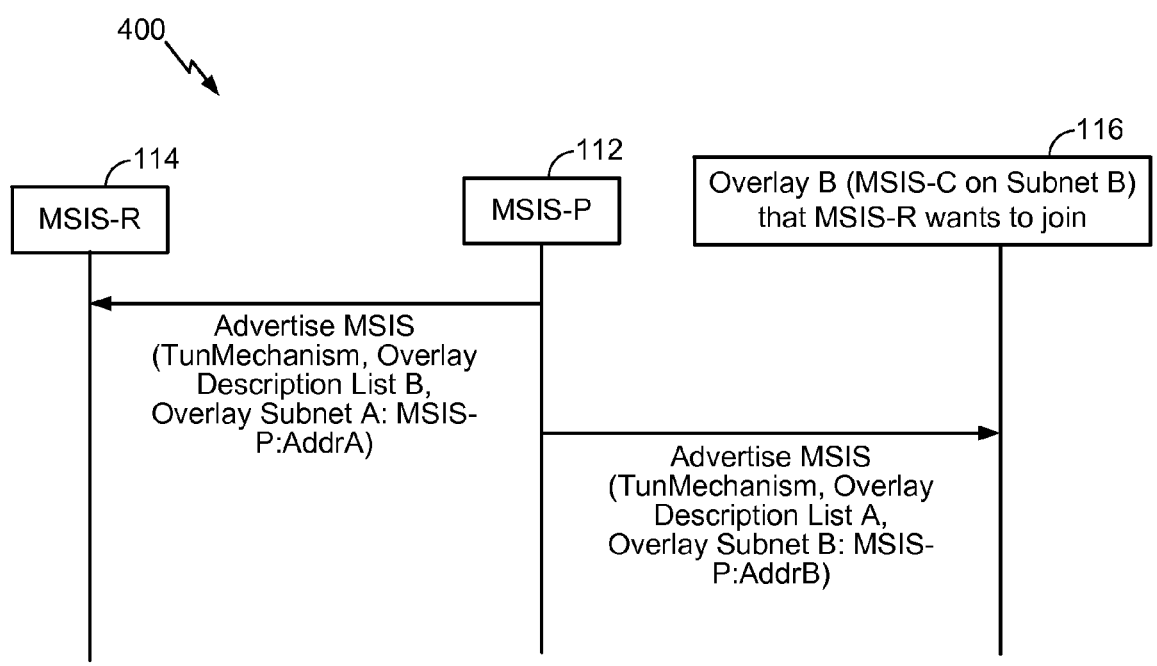
FIG. 4 shows exemplary advertisement messaging for use in aspects of a MSI system.

FIG. 4 shows exemplary advertisement messaging 400 for use in aspects of a MSI system. In an aspect, the MSIS-P 112 sends out AdvertiseMSIS messages and the impact of those messages on the nodes of two subnets is illustrated The MSIS-P 112 sends out AdvertiseMSIS messages through each of its two interfaces. For example, the MSIS-P 112 has a first interface to MSIS-R 114 and a second interface to MSIS-C 116. Before doing so, it waits for some amount of time (random time slightly greater than upper bound of Minimum Advertisement Time Window) to receive any AdvertiseMSIS messages to learn of any OverlaySubnetId's of the subnets it is connected to using the two interfaces. It reuses the OverlaySubnetIds, if any are determined from received MSIS Advertisements. Otherwise, MSIS-P 112 generates a random OverlaySubnetId for each subnet and uses that in the advertisements it sends out. The AdvertiseMSIS messages that are sent include OverlayDescriptionLists (A or B) representing the set of overlays that are reachable through the MSIS-P 112 on subnet (A or B). Also, the MSIS-P 112 includes its interface address where it can be reached using the tunnel mechanism identified in the AdvertiseMSIS messages. The interface addresses are qualified by using overlay subnet identifier which will be used by nodes at either end to learn this identifier.

The MSIS-R 114 on receiving the AdvertiseMSIS message stores state in the Known Overlay Table storing a tuple MSIS-R-OverlayDescriptionListB:InterfaceA-Current_Time-OverlaySubnetA:MSIS-P-AddrA in the table. Here, MSIS-R-InterfaceA is the IP address of the interface of MSIS-R (in Subnet A) on which the advertisement was received.

A tuple comprising at least the following information is stored.

1. Service name (e.g. Address Family Interchange Service);
2. Publishing node;
3. Route destination (expressed in CIDR notation):
4. Destination network identifier (used to disambiguate networks using the same IP address ranges, such as private network as defined in IETF-RFC 1918);
5. Next hop (IF address and port of new tunnel endpoint, or the route for which metadata is being provided); and
6. Any metadata (e.g. rate of ECN messages received via this path). Whether published or searchable within an overlay context, this information allows participating nodes to establish routes to nodes which would otherwise have been unreachable or establish better routes.

Tunnel Formation Process

Figure 5:
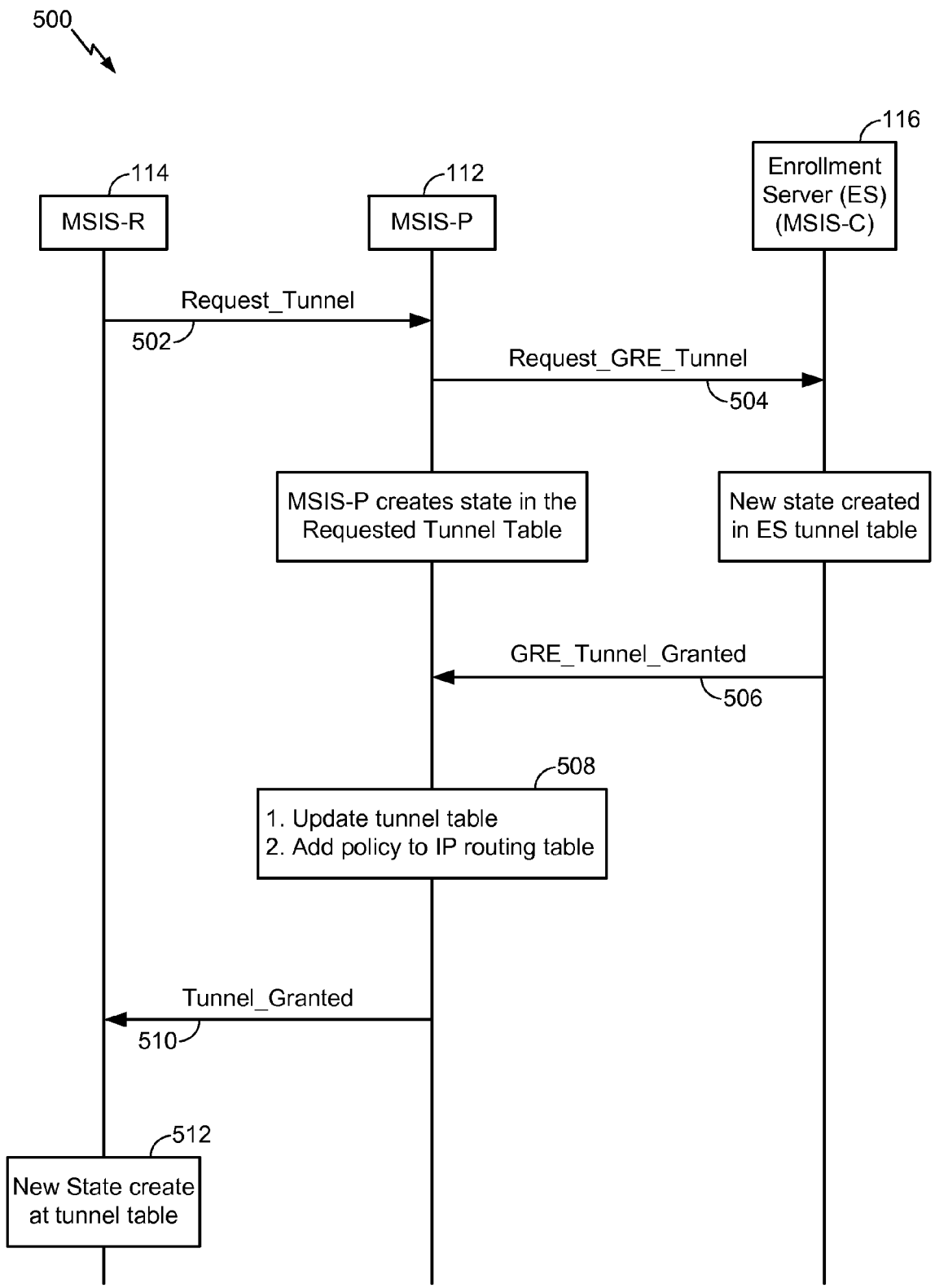
FIG. 5 shows exemplary tunnel formation messaging for use in aspects of a MSI system.

FIG. 5 shows exemplary tunnel formation messaging 500 for use in aspects of a MSI system. The tunnel formation messaging is illustrated using the MSIS-R 114 attempting to contact an enrollment server on Subnet B (MSIS-C 116) through the MSIS-P 112. The tunnel formation process is set in motion when an application at the MSIS-R 114 desires to access an overlay advertised in the Known Overlay Table, and uses overlay middleware to assemble a CreateTunnel request to forward an ENROLL packet to the enrollment server reachable through the MSIS-P 112 Thus, the application calls the CreateTunnel API having the following format.

CreateTunnel(OverlaySubnetId:RequestorAddress,
  OverlaySubnetId:RequesteeAddress,
  OverlaySubnetId:SecondaryRequesteeAddress,
    Options).

The qualified IP addresses imply that a MSIS-P 112 has advertised this overlay and the MSIS-R 114 has determined from the Known Overlay Table which MSIS-P has advertised the OverlaySubnetId.

Tunnel formation can also be initiated when the MSIS-R 114 wants to contact a Bootstrap peer on OverlaySubnetB or when ICE connectivity checks are being done for a tunneled candidate. In the latter case, the following design stays the same, except for renaming of MSIS-R and ES with the two nodes that want to do ICE connectivity checks using tunneled candidate.

It should be noted that the tunnel formation process presented in this section can be extended to form a TCP connection between the MSIS-R 114 (Requestor) and MSIS-C 116 (Secondary Requestee). The RequestTunnel message can include the SYN message, the TunnelGranted message can include the SYN-ACK, and an ACK can be sent through the tunnel that has been formed. This section assumes that no tunnels exist between these nodes due to past interactions.

Referring now to FIG. 5, the following operations occur in the tunnel formation process.

At reference 502, the MSIS-R 114 decides to join one of the overlays it knows about from the Known Overlay Table. It looks up the entry to find the IP address of the MSIS-P 112 which advertised the Overlay. In this case the address is OverlaySubnetA:MSIS-P-AddrA. The MSIS-R 114 then sends a RequestTunnel message to MSIS-P-AddrA as follows;

RequestTunnel(OverlaySubnetA:MSIS-R-AddrA,OverlaySubnetA:MSIS-P-AddrA,  OverlaySubnetB:ES, Options)

where ES represents the address of the Enrollment Server for the particular overlay MSIS-R 114 want to join in subnet B and Options can include authentication information.

It is important to note that this RequestTunnel message is sent even if a tunnel exists between MSIS-R 114 and OverlaySubnetA:MSIS-P-AddrA. This is because MSIS-P 112 uses this message to create a tunnel with OverlaySubnetB:ES. Any tunnels that exist between MSIS-R 114 and MSIS-P 112 with OverlaySubnetB as the UniqueOverlaySubnetId, and between MSIS-P 112 and ES 116 with OverlaySubnetA as the UniqueOverlaySubnetId will be reused.

At reference 504, the MSIS-P 112 receives the RequestTunnel message and extracts the SecondaryRequesteeAddress which is OverlaySubnetB:ES. It then looks up its Tunnel Table to see if a tunnel already exists from itself to OverlaySubnetB:ES with OverlaySubnetA as the UniqueOverlaySubnetId. If yes and the request is already properly authenticated, the call flow proceeds to reference 508, otherwise, MSIS-P 112 sends a RequestGRETunnel message as follows;

RequestGRETunnel(OverlaySubnetA:MSIS-R-AddrA,
  OverlaySubnetB:MSIS-P-AddrB, OverlaySubnetB:ES,
  Options)

where MSIS-P-AddrB is the address of the interface of MSIS-P 112 on Subnet B.

The MSIS-P 112 also creates an entry in the Requested Tunnel Table with the OverlaySubnetA:MSIS-R-AddrA as the OverlaySubnetId:RequestingAddr and OverlaySubnetB:ES as the OverlaySubnetId:TunDestAddr and OverlaySubnetA as the UniqueOverlaySubnetId.

At reference 506, the ES at MSIS-C 116 receives the RequestGRETunnel message and based on the options field (or other criteria) decides whether or not to grant the GRE tunnel. If the Enrollment Server grants the GRE Tunnel, it creates an entry in its Tunnel Table generating a new TunId and associating it with the tuple comprising OverlaySubnetB:ES as OverlaySubnetId:TunnelSrc and OverlaySubnetB:MSIS-P-AddrB as OverlaySubnetId:TunnelDest and OverlaySubnetA as the UniqueOverlaySubnetId and Network Interface as a new GRE interface say G1.

A corresponding GRE interface G1 is also created at the GRE layer with its unique key and other associated identifiers. The ES at MSIS-C 116 then sends a GRETunnelGranted message to the MSIS-P-AddrB through regular IP routing as follows;

GRETunnelGranted(OverlaySubnetA:MSIS-R-AddrA,
  OverlaySubnetB:MSIS-P-AddrB,OverlaySubnetB:ES,
  TunnelIdentifier, Options)

If the ES refuses to grant the GRE Tunnel, it sends a Tunnel Refusal Message to MSIS-P 112, which will be propagated back to MSIS-R 114.

At reference 508, the MSIS-P 112 receives the GRETunnelGranted message and it matches the fields in that message with Tunnel Requested Table. Specifically, it matches OverlaySubnetId:OnBehalfofAddress in the message with OverlaySubnetId:RequestingAddr in the table and OverlaySubnetId:RequesteeAddress in the message with OverlaySubnetId:TunDestAddr in the table and OverlaySubnetId of OverlaySubnetId:OnBehalfofAddress in the message with UniqueOverlaySubnetId in the table. If an entry is found, the MSIS-P 112 now knows that MSIS-R 114 requested this tunnel to be setup and a tunnel has been formed to satisfy the request.

Assuming a tunnel already exists between OverlaySubnetB:MSIS-P-AddrB and OverlaySubnetB:ES; then to remember this, the MSIS-P 112 creates an entry in its Tunnel Table, generating a locally unique TunId to identify the tunnel and storing the tuple TunId; OverlaySubnetB:MSIS-P-AddrB; OverlaySubnetB:ES; OverlaySubnetA; G1; in the Tunnel Table. Here G1 is the virtual interface of the GRE tunnel created. The information about this interface (like the GRE key) is stored at the GRE layer so that the interface G1 can be used in the future. MSIS-P 112 also deletes the corresponding entry from the Tunnel Requested Table.

The MSIS-P 112 then looks up the Tunnel Table to see if a Tunnel exists from its OverlaySubnetA interface (OverlaySubnetA:MSIS-P-AddrA) to OverlaySubnetA:MSIS-R-AddrA with OverlaySubnetB (extracted from Requestee address) as the unique OverlaySubnetId. If MSIS-P 112 discovers a tunnel exists between OverlaySubnetA:MSIS-P-AddrA and OverlaySubnetA:MSIS-R-AddrA, it notes the interface information (GRE key) say G2 for communication in a TunnelGranted message. If the tunnel does not exist, it creates a new GRE key and creates a virtual GRE interface G2.

The MSIS-P 112 then creates policy entries in the routing table to be able to forward packets from one tunnel to the other. The entries are as follows.

a. If a packet comes on interface G2 and is destined to ES, then send the packet through interface G1.

b. If a packet comes on interface G1 and is destined to MSIS-R-AddrA, then send the packet through interface G2.

It should be noted that the MSIS-P 112 creates the policy entries whether or not a tunnel already existed. Likewise, these policies are refreshed just like the tunnels themselves. For instance, two different MSIS-R nodes (R1 and R2) may have tunnels arranged through an MSIS-P node for the same MSIS-C node. If MSIS-R1 does not refresh its tunnel, the tunnel between it and the MSIS-P goes away. The policy that routes packets between that tunnel and the shared tunnel between MSIS-P and MSIS-C should go away. The tunnel between MSIS-P and MSIS-C remains because MSIS-R2 still uses that tunnel.

At reference 510, the MSIS-P 112 then sends a TunnelGranted Message to MSIS-R 114 with the following fields: OverlaySubnetA:MSIS-R-AddrA as OverlaySubnetId:RequestorAddress and OverlaySubnetA:MSIS-P-AddrA as the OverlaySubnetId:RequesteeAddress and OverlaySubnetB:ES as the OverlaySubnetId:SecondaryRequesteeAddress and GRE key (of G2) as the Tunnel Identifying Info and possibly other authentication related fields in the Options field.

At reference 512, the TunnelGranted message arrives at MSIS-R 114. The MSIS-R 114 then uses the information sent in the message to set up a GRE interface say G2. It creates an entry in its Tunnel Table, generating a locally unique TunId to identify the tunnel and storing the following tuple in the Tunnel Table.

TunId; OverlaySubnetA:MSIS-R-AddrA; OverlaySubnetA:MSIS-P-AddrA; OverlaySubnetB; G2

Example of MSI System Operation Between Overlay Nodes

In an aspect, the Tunnel Formation Process can be enhanced when the MSI system requestor and correspondent nodes are in the greater networks that comprise the subnets adjacent to the provider. The correspondent obtains the subnet and provider contact information from the overlay. The correspondent publishes the provider's contact information in the disjoint subnets to the overlay. The request learns of that contact information through the overlay. This includes the subnet identifier that the correspondent's network comprises, the address and subnet identifier for the provider in the remaining subnets that the provider is connected to. The requestor starts the tunnel formation process using a subnet identifier and provider address that the requestor's network comprises. This may be known as a result of previous successful connections or learned experimentally through attempting to setup a tunnel. The tunnel setup process progresses as documented in the tunnel formation process above.

Connectivity Layer (CL)

The Connectivity Layer includes in the following data structures for supporting the MSI system.

Connection Table

The Connection table is maintained by the CL. In an aspect, a new field referred to as "TunId" is added. The fields of the Connection Table are provided as follows.
1. Connection Id: The Identifier identifying the connection
2. Connection Tuple: This contains source and destination IPv4 or IPv6 addresses, ports, and protocol.
3. Network Interface: The interface of the node on which to send packets for this connection.
4. TunId: The tunnel identifier associated with this connection. It may be an invalid identifier (e.g. 0 or a negative value) if no Tunnel is associated with the connection identified by Connection Id.

Tunnel Table

The Tunnel Table is the table that indicates the nodes to which tunnels exist. The fields of the Tunnel Table are provided as follows.
1. TunId: The Identifier that refers to this entry.
2. OverlaySubnetId:TunnelSrc: The Address (IP Address and Port number qualified with Overlay Subnet Identifier) of the source of the tunnel. This address should be same as one of the interface addresses of the node on which this tunnel table is stored.
3. OverlaySubnetId:TunnelDest: The Address (IP Address and Port number) of the destination of the tunnel.
4. UniqueOverlaySubnetId: The overlay subnet id (different than the overlay subnet id of TunnelSrc and TunnelDest) for which this tunnel is unique. For example, a tunnel between OverlaySubnetA:MSIS-R-AddrA and OverlaySubnetA:MSIS-P-AddrA can have OverlaySubnetB as the UniqueOverlaySubnetId. However, if MSIS-P also advertises overlays on OverlaySubnetC, and MSIS-R wants to communicate with those overlays, then another tunnel would be needed between OverlaySubnetA:MSIS-R-AddrA and OverlaySubnetA:MSIS-P-AddrA with OverlaySubnetC as the UniqueOverlaySubnetId.
5. Network Interface: The interface of MSIS-R on which to send out a packet when sending the packet through the tunnel (Should be the same as the 'Network Interface' field in the Connection Table of any connection that uses this tunnel). This is expected to be a GRE tunnel interface that has been created using the tunnel formation mechanism above.
6. TunMechanism: The Tunneling Mechanism used for the Tunnel. This is expected to be GRE but may be any other suitable tunneling mechanism.

Requested Tunnel Table

The Requested Tunnel Table stores information about the tunnels that this node has been requested to setup but the setup hasn't completed yet. The fields of the Requested Tunnel Table are provided as follows.
1. OverlaySubnetId:RequestingAddr: The address of the node that has requested this tunnel to be setup by the current node qualified with the overlay subnet identifier. For example, at the MSIS-P 112, this address is expected to be OverlaySubnetA:MSIS-R-AddrA.
2. OverlaySubnetId:TunDestAddr: The address of the node with which the tunnel has been requested i.e. the proposed tunnel destination (or endpoint). For example, at the MSIS-P 112, this address is expected to be OverlaySubnetB:ES
3. UniqueOverlaySubnetId: The overlay subnet identifier for which this tunnel is uniquely bridging to TunDestAddr. In an aspect, this identifier is the same as in field 1 above.
4. Options: Other options contained in the RequestTunnel message that need to be stored in this table. The time when the request came can also be stored to purge stale requests.

Overlay Network Layer

Known Overlay Table

The Known Overlay Table keeps track of the Overlays that have been advertised through Overlay Advertisements which this node has heard about. It also associates the advertisement received with the interface on which it was received. Storing information about all the overlays that a node knows about in this table is required for MSIS-P; however it is recommended that all MSIS nodes keep track of at least some overlays that have been advertised.

The Known Overlay Table has one or more instances of KnownOverlayElement comprising the following tuple as provided below.
1. OverlayDescriptionList:Interface:Time:Advertiser_Address: This tuple stores the local interface ID (which can be the IP address) linked with the OverlayDescriptionList data structure that can be the complete or partial OverlayDescriptionList data structure that has been received through that interface. The descriptions are also linked with the address of the node that advertised this list of overlays (Advertiser_Address) and the address may or may not be qualified with an OverlaySubnetId. In the case of MSIS-R in Subnet A, the Advertiser_Address will be OverlaySubnetA:MSIS-P-AddrA. These descriptions are also linked in with the time when they are advertised to allow for stale advertisements to be purged and new advertisements to replace old ones.

The entries in Known Overlay Table which are created due to MSIS Advertisements are purged after a reasonable time period (at least the upper bound on Minimum Advertisement Time Window). This happens because the Overlays learned as a result of the MSI system are transient because the MSIS-P 112 may only provide forwarding services for a certain time interval. Thus, the entries are purged if not refreshed by MSIS Advertisements. It is also important to note that the IP addresses in the OverlayDescriptionList may or may not be qualified with Overlay Subnet Identifiers depending upon whether the advertisement comes from a MSIS-P or not.

Figure 6:
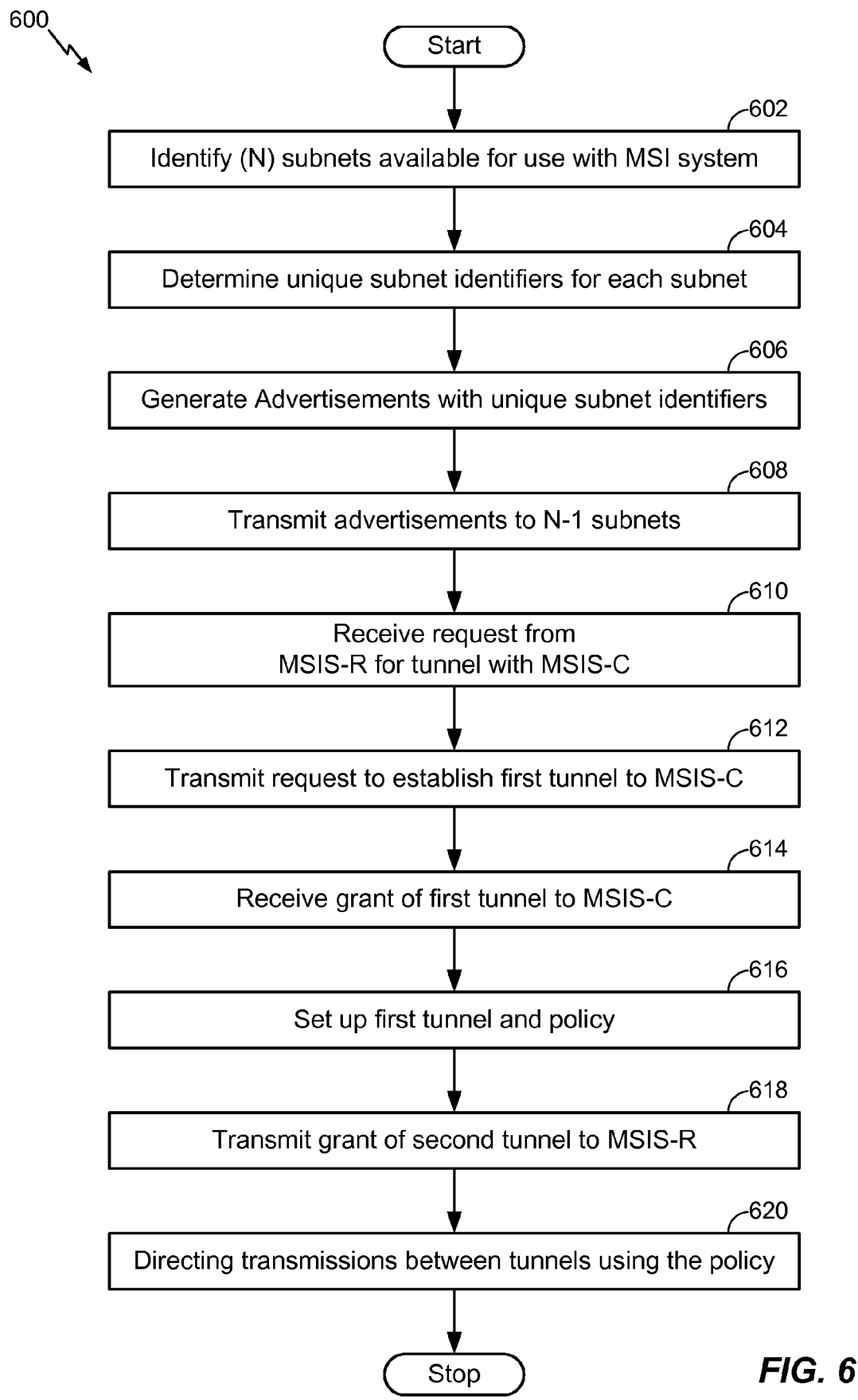
FIG. 6 shows an exemplary method for operating a MSIS-P to provide aspects of a MSI system.

FIG. 6 shows an exemplary method 600 for operating a MSIS-P at a node to provide aspects of a peer-to-peer overlay network discovery system. For clarity, the method 600 is described below with reference to the MSIS-P 200 shown in FIG. 2. In an aspect, the processor 202 executes one or more sets of codes provided by the MSI module 214 to control the MSIS-P 200 to perform the functions described below.

At block 602, (N) subnets available for use by the MSI system are identified. For example, the processor 202 acquires information about the N subnets by receiving advertisements on an underlying network.

At block 604, unique subnet identifiers are determined for each subnet. In one case, the unique subnet identifiers are received from other MSIS-Ps in AdvertiseMSIS messages. In another case, the processor 202 operates to generate the unique subnet identifiers. The subnet information is maintained in the subnet database 216.

At block 606, advertisements are generated to advertise accessibility to the subnets. In an aspect, the processor 202 operates to generate the advertisements to identify the available subnets using the unique subnet identifiers and to provide an unambiguous address that can be used to establish communication with each subnet.

At block 608, the advertisements are transmitted to N−1 subnets that have been identified. In an aspect, the processor 202 controls the transceiver 206 to transmit the advertisements on the available interfaces 212 in one or more AdvertiseMSIS messages. For example, an advertisement is transmitted to a first subnet advertising the accessibility of one or more subnets, wherein for each of the one or more subnets the advertisement comprises an address and a unique subnet identifier, and wherein the unique subnet identifiers disambiguate overlapping addresses At block 610, a request is received from an MSIS-R to connect to an ES at an MSIS-C. In an aspect the request is a RequestTunnel message that includes the unique subnet identifier of the MSIS-C that the connection is addressed to. In an aspect the transceiver 206 receives the request and passes it to the processor 202. For example, the request is received from a first network comprising the first subnet to establish communications with a second network comprising the second subnet, wherein the request identifies the first and second subnets by their associated addresses and subnet identifiers.

At block 612, a request is transmitted to the MSIS-C to establish a tunnel with the MSIS-C. For example, the processor 202 generates a GRETunnelRequest message that is transmitted to the MSIS-C by the transceiver 206.

At block 614, a grant is received from the MSIS-C to allow a tunnel to be established between the MSIS-P and the MSIS-C. In an aspect, the grant is received by the transceiver 206 in a GRETunnelGranted message from the MSIS-C and passed to the processor 202.

At block 616, tunnel setup is performed to establish a first tunnel with the MSIS-C. In an aspect, the processor 202 operates to set up the first tunnel. A determination is made as to whether a tunnel already exists. If so, the processor utilizes this tunnel to set up policy to forward packets to the MSIS-C. In another aspect, the tunnel does not already exist and so the processor 202 operates to set up the first tunnel and set up the policy accordingly. For example, the policy is set up as described above.

At block 618, a grant is transmitted to the MSIS-R granting the request to establish a tunnel. In an aspect, the processor 202 generates a TunnelGranted message that the transceiver 206 transmits to the MSIS-R.

At block 620, transmissions are directed between tunnels using the policy information. For example, packets received from the MSIS-R over the second tunnel are forwarded to the MSIS-C using the first tunnel. In addition, packets received from the MSIS-C over the first tunnel are forwarded to the MSIS-R using the second tunnel. In another aspect, transmissions are directed between the first and second tunnels based on policy information to allow communications between the first network comprising the first subnet and the second network comprising the second subnet. This allows a node in a network comprising subnet A to communicate with overlays in a disjoint network comprising subnet B in a fast and efficient manner.

Therefore, the method 600 is performed by MSIS-P 200 operating at a node to provide aspects of a MSI system. It should be noted that the method 600 is just one implementation and that the operations of the method 600 may be rearranged or otherwise modified within the scope of the various aspects. Thus, other implementations are possible.

Figure 7:
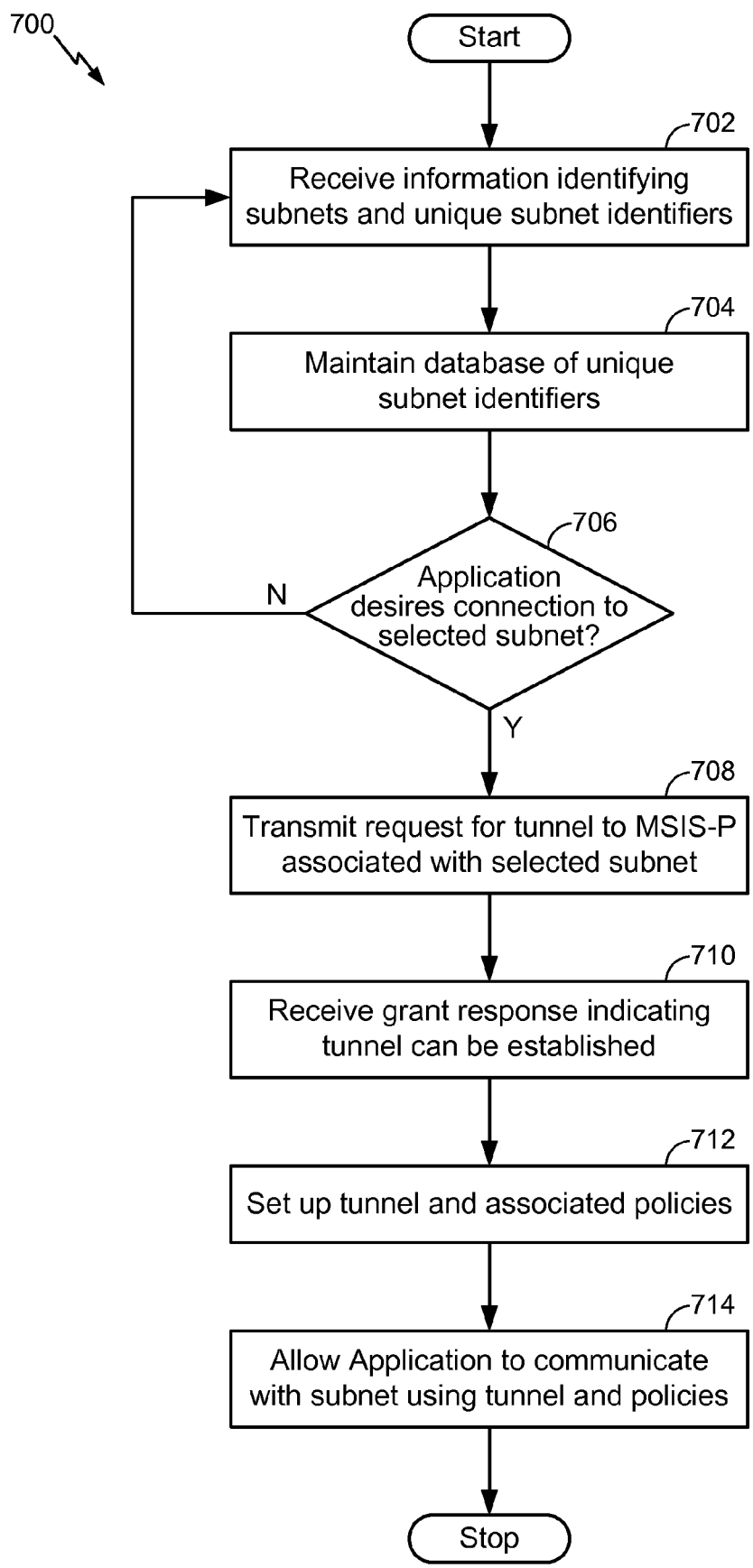
FIG. 7 shows an exemplary method for operating a MSIS-R to provide aspects of a MSI system.

FIG. 7 shows an exemplary method 700 for operating a MSIS-R at a node to provide aspects of a MSI system. For clarity, the method 700 is described below with reference to the MSIS-R 300 shown in FIG. 3. In an aspect, the processor 302 executes one or more sets of codes provided by the discovery module 314 to control the MSIS-R 300 to perform the functions described below.

At block 702, information is received identifying available subnets and includes unique subnet identifiers. In an aspect, the advertisements comprise AdvertiseMSIS messages received from a MSIS-P. For example, the transceiver 306 receives the advertisements and passes them to the processor 302. In another aspect, the information is received in a MSIS-relayed network address. The available subnets are associated with unique subnet identifiers and represent subnets that are disjoint from the subnet in which the MSIS-R belongs. For example, the information identifies an address and a unique subnet identifier for each of one or more subnets in addition to identifying a provider node, wherein the unique subnet identifiers disambiguate overlapping addresses.

At block 704, a database is maintained of available subnets and associated subnet identifiers. In an aspect, the processor 302 maintains the subnet information in the database 312.

At block 706, a determination is made as to whether there is an application that desires a connection to a (MSIS-C) having a subnet identifier that is in the database of subnet identifiers. If there is an application that desires a connection, a selected subnet for communications to a correspondent node is identified, wherein the correspondent node is in a disjoint network that comprises the selected subnet. The method proceeds to block 708. If there is no application desiring a connection, the method proceeds to block 702.

At block 708, a request for a tunnel is transmitted to the MSIS-P that transmitted the advertisement associated with the selected subnet. In an aspect, the processor 302 generates a TunnelRequest message that is transmitted by the transceiver 306 to the MSIS-P. The TunnelRequest message specifies the MSIS-C to connect to which a connection is desired.

At block 710, a tunnel grant response is received indicating a tunnel from the MSIS-P to the selected subnet has been established. In an aspect, a TunnelGranted message is received by the transceiver 306 and passed to the processor 302.

At block 712, a tunnel is set up to the MSIS-P and associated policies are established. In an aspect, the processor 302 sets up the tunnel and associated policies to allow the application to communicate with the MSIS-C using the tunnel.

At block 714, the application is allowed to communicate with the MSIS-C using the tunnel and associated policies. For example, communications with the correspondent node can be performed using the tunnel based on policy information.

Therefore, the method 700 is performed by MSIS-R 300 at a node to provide aspects of a MSI system. It should be noted that the method 700 is just one implementation and that the operations of the method 700 may be rearranged or otherwise modified within the scope of the various aspects. Thus, other implementations are possible with the scope of the various aspects described herein.

Figure 8:
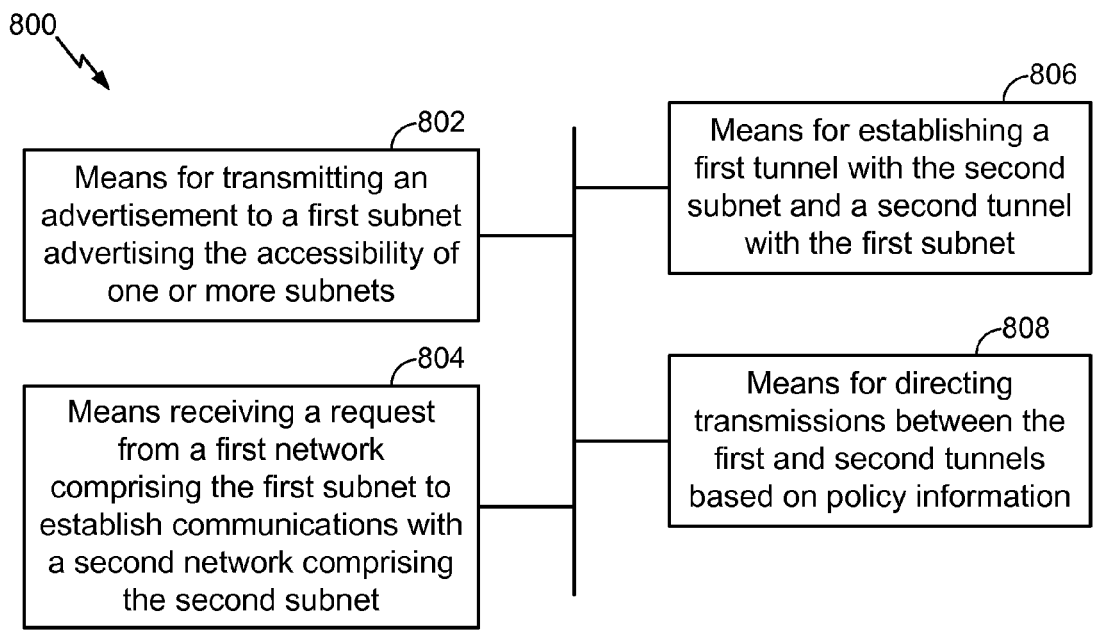
FIG. 8 shows an exemplary MSIS-P for use in aspects of an MSI system.

FIG. 8 shows an exemplary MSIS-P 800 for use in aspects of a MSI system. In an aspect, the MSIS-P 800 is implemented by at least one integrated circuit comprising one or more modules configured to provide aspects of a MSI system as described herein. For example, in an aspect, each module comprises hardware and/or hardware executing software.

The MSIS-P 800 comprises a first module comprising means (802) for transmitting an advertisement to a first subnet advertising the accessibility of one or more subnets, wherein for each of the one or more subnets the advertisement comprises an address and a unique subnet identifier, and wherein the unique subnet identifiers disambiguate overlapping addresses, which in an aspect comprises the transceiver 206. The MSIS-P 800 also comprises a second module comprising means (804) for receiving a request from a first network comprising the first subnet to establish communications with a second network comprising the second subnet, wherein the request identifies the first and second subnets by their associated addresses and subnet identifiers, which in an aspect comprises the transceiver 206. The MSIS-P 800 also comprises a third module comprising means (806) for establishing a first tunnel with the second subnet and a second tunnel with the first subnet, which in an aspect comprises the processor 202. The MSIS-P 800 also comprises a fourth module comprising means (808) for directing transmissions between the first and second tunnels based on policy information to allow communications between the first network comprising the first subnet and the second network comprising the second subnet, which in an aspect comprises the processor 202.

Figure 9:
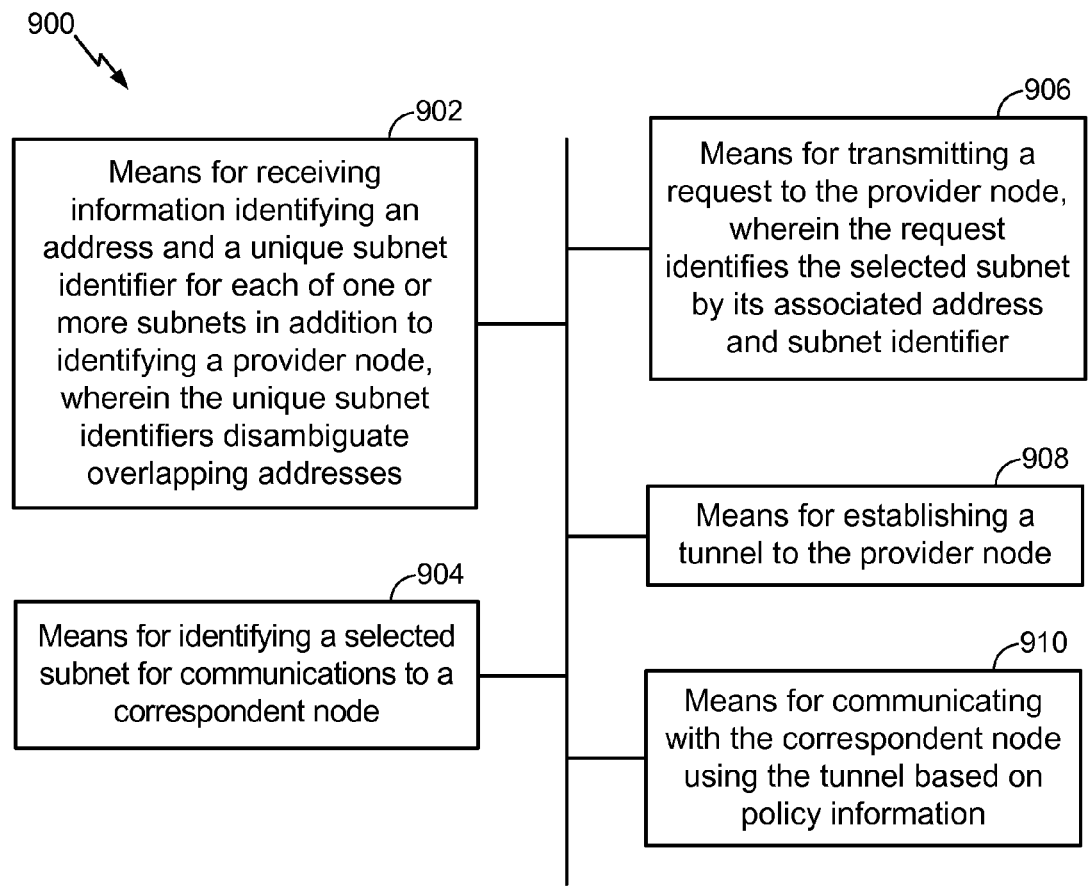
FIG. 9 shows an exemplary MSIS-R for use in aspects of an MSI system.

FIG. 9 shows an exemplary MSIS-R 900 for use in aspects of a MSI system. In an aspect, the MSIS-R 900 is implemented by at least one integrated circuit comprising one or more modules configured to provide aspects of an overlay network discovery system as described herein. For example, in an aspect, each module comprises hardware and/or hardware executing software.

The MSIS-R 900 comprises a first module comprising means (902) for receiving information identifying an address and a unique subnet identifier for each of one or more subnets in addition to identifying a provider node, wherein the unique subnet identifiers disambiguate overlapping addresses, which in an aspect comprises the transceiver 306. The MSIS-R 900 also comprises a second module comprising means (904) for identifying a selected subnet for communications to a correspondent node, wherein the correspondent node is in a disjoint network that comprises the selected subnet, which in an aspect comprises the processor 302. The MSIS-R 900 also comprises a third module comprising means (906) for transmitting a request to the provider node, wherein the request identifies the selected subnet by its associated address and subnet identifier, which in an aspect comprises the transceiver 306. The MSIS-R 900 also comprises a fourth module comprising means (908) for establishing a tunnel to the provider node, which in an aspect comprises the processor 302. The MSIS-R 900 also comprises a fifth module comprising means (910) for communicating with the correspondent node using the tunnel based on policy information, which in an aspect comprises the processor 302.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a wireless communication device. In the alternative, the processor and the storage medium may reside as discrete components in a wireless communication device.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a MSI system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for providing communication between a first network and a second network, the method comprising:
transmitting an advertisement to a first subnet of the first network advertising the accessibility of a second subnet of the second network, wherein the first network is disjoint from the second network, wherein the advertisement includes a second address and a second unique subnet identifier corresponding to the second subnet, wherein a first address and a first unique subnet identifier are associated with the first subnet, and wherein unique subnet identifiers disambiguate overlapping addresses;
receiving a request from the first network to establish communications with the second network, wherein the request identifies the first address and the first unique subnet identifier corresponding to the first subnet and the second address and the second unique identifier corresponding to the second subnet;
establishing a first tunnel between a provider node and the second subnet;
establishing a second tunnel between the provider node and the first subnet; and
directing, by the provider node, a transmission between the first tunnel and the second tunnel based on policy information which results in communication between the first network and the second network.

2. The method of claim 1, further comprising receiving one or more messages that identify one or more subnets.

3. The method of claim 2, further comprising generating the advertisement wherein at least one of the first unique subnet identifier and the second unique subnet identifier are determined from the one or more messages.

4. The method of claim 1, further comprising generating the advertisement wherein the unique subnet identifiers are randomly generated.

5. The method of claim 1, wherein said receiving comprises receiving a tunnel request to establish a tunnel from the first subnet to the provider node for the purpose of communicating with the second subnet.

6. The method of claim 1, wherein said establishing comprises:
transmitting a tunnel request message to the second subnet; and
receiving a tunnel grant message from the second subnet.

7. The method of claim 1, wherein said establishing comprises generating the policy information to allow packets to be forwarded between the first and second tunnels.

8. The method of claim 1, wherein the first tunnel is established based on the second address and the second unique subnet identifier, and wherein the second tunnel is established based on the first address and the first unique subnet identifier.

9. An apparatus for providing communication between a first network and a second network, the apparatus comprising:
a transceiver configured to transmit an advertisement to a first subnet of the first network advertising the accessibility of a second subnet of the second network, wherein the first network is disjoint from the second network, wherein the advertisement includes a second address and a second unique subnet identifier corresponding to the second subnet, wherein a first address and a first unique subnet identifier are associated with the first subnet, and wherein unique subnet identifiers disambiguate overlapping addresses, the transceiver further configured to a request from the first network to establish communications with the second network, wherein the request identifies the first address and the first unique subnet identifier corresponding to the first subnet and the second address and the second unique identifier corresponding to the second subnet; and
a processor configured to establish a first tunnel between a provider node and the second subnet and a second tunnel between the provider node and the first subnet and further configured to direct, by the provider node, a transmission between the first tunnel and the second tunnel based on policy information which results in communication between the first network and the second network.

10. The apparatus of claim 9, wherein said transceiver is configured to receive one or more messages that identify one or more subnets.

11. The apparatus of claim 10, wherein said processor is configured to generate the advertisement at least one of the first unique subnet identifier and the second unique subnet identifier are determined from the one or more messages.

12. The apparatus of claim 9, wherein said processor is configured to generate the advertisement wherein the unique subnet identifiers are randomly generated.

13. The apparatus of claim 9, wherein said transceiver is configured to receive a tunnel request to establish a tunnel from the first subnet to the provider node for the purpose of communicating with the second subnet.

14. The apparatus of claim 9, wherein said transceiver is configured to:
transmit a tunnel request message to the second subnet; and
receive a tunnel grant message from the second subnet.

15. The apparatus of claim 9, wherein said processor is configured to generate the policy information to allow packets to be forwarded between the first and second tunnels.

16. The apparatus of claim 9, wherein the first tunnel is established based on the second address and the second unique subnet identifier, and wherein the second tunnel is established based on the first address and the first unique subnet identifier.

17. An apparatus for providing communication between a first network and a second network, the apparatus comprising:
means for transmitting an advertisement to a first subnet of the first network advertising the accessibility of a second subnet of the second network, wherein the first network is disjoint from the second network, wherein the advertisement includes a second address and a second unique subnet identifier corresponding to the second subnet, wherein a first address and a first unique subnet identifier are associated with the first subnet, and wherein unique subnet identifiers disambiguate overlapping addresses;
means for receiving a request from the first network to establish communications with the second network, wherein the request identifies the first address and the first unique subnet identifier corresponding to the first subnet and the second address and the second unique identifier corresponding to the second subnet;
means for establishing a first tunnel between a provider node and the second subnet;
means for establishing a second tunnel between the provider node and the first subnet; and
means for directing a transmission between the first tunnel and the second tunnel based on policy information which results in communication between the first network and the second network.

18. The apparatus of claim 17, further comprising means for receiving one or more messages that identify one or more subnets.

19. The apparatus of claim 18, further comprising means for generating the advertisement wherein at least one of the first unique subnet identifier and the second unique subnet identifier are determined from the one or more messages.

20. The apparatus of claim 17, further comprising means for generating the advertisement wherein the unique subnet identifiers are randomly generated.

21. The apparatus of claim 17, wherein said means for receiving comprises means for receiving a tunnel request to establish a tunnel from the first subnet to the provider node for the purpose of communicating with the second subnet.

22. The apparatus of claim 17, wherein said means for establishing comprises:
means for transmitting a tunnel request message to the second subnet; and
means for receiving a tunnel grant message from the second subnet.

23. The apparatus of claim 17, wherein said means for establishing comprises means for generating the policy information to allow packets to be forwarded between the first and second tunnels.

24. The apparatus of claim 17, wherein the first tunnel is established based on the second address and the second unique subnet identifier, and wherein the second tunnel is established based on the first address and the first unique subnet identifier.

25. A computer program product for providing communication between a first network and a second network, the computer program product comprising:
a non-transitory computer-readable medium embodying codes executable to:
transmit an advertisement to a first subnet of the first network advertising the accessibility of a second subnet of the second network, wherein the first network is disjoint from the second network, wherein the advertisement includes a second address and a second unique subnet identifier corresponding to the second subnet, wherein a first address and a first unique subnet identifier are associated with the first subnet, and wherein unique subnet identifiers disambiguate overlapping addresses;

receive a request from the first network to establish communications with the second network, wherein the request identifies the first address and the first unique subnet identifier corresponding to the first subnet and the second address and the second unique identifier corresponding to the second subnet;

establish a first tunnel between a provider node and the second subnet;

establish a second tunnel between the provider node and the first subnet; and direct, by the provider node, a transmission between the first tunnel and the second tunnel based on policy information which results in communication between the first network and the second network.

26. The computer program product of claim 25, wherein said codes are configured to receive one or more messages that identify one or more subnets.

27. The computer program product of claim 26, wherein said codes are configured to generate the advertisement wherein at least one of the first unique subnet identifier and the second unique subnet identifier are determined from the one or more messages.

28. The computer program product of claim 25, wherein said codes are configured to generate the advertisement wherein the unique subnet identifiers are randomly generated.

29. The computer program product of claim 25, wherein said codes are configured to receive a tunnel request to establish a tunnel from the first subnet to the provider node for the purpose of communicating with the second subnet.

30. The computer program product of claim 25, wherein said codes are configured to:
transmit a tunnel request message to the second subnet; and
receive a tunnel grant message from the second subnet.

31. The computer program product of claim 25, wherein said codes are configured to generate the policy information to allow packets to be forwarded between the first and second tunnels.

32. The computer program product of claim 25, wherein the first tunnel is established based on the second address and the second unique subnet identifier, and wherein the second tunnel is established based on the first address and the first unique subnet identifier.

33. A method for operating a first node to communicate with a disjoint network, wherein the first node is in at least one of a subnet and a peer-to-peer overlay network, the method comprising:
receiving an advertisement that advertises the accessibility of a second subnet, wherein the second network is disjoint to the first node, wherein the advertisement includes information identifying an address and a unique subnet identifier for the second subnet and information identifying a provider node, wherein unique subnet identifiers disambiguate overlapping addresses;
identifying the second subnet for communications to a correspondent node, wherein the correspondent node includes the second subnet, and wherein the correspondent node is disjoint to the first node;
transmitting a request to the provider node, wherein the request identifies the second subnet by the address and subnet identifier associated with the second node;
establishing a tunnel to the provider node; and
communicating with the correspondent node using the tunnel based on policy information.

34. The method of claim 33, further comprising receiving the advertisement from the provider node.

35. The method of claim 33, further comprising receiving the advertisement in a Multi-link Subnet Interchange (MSI) system qualified network address.

36. An apparatus for use at a first node to communicate with a disjoint network networks, wherein the first node is in at least one of a subnet and a peer-to-peer overlay network, the apparatus comprising:
a transceiver configured to receive an advertisement that advertises the accessibility of a second subnet, wherein the second network is disjoint to the first node, wherein the advertisement includes information identifying an address and a unique subnet identifier for the second subnet and information identifying a provider node, wherein the unique subnet identifiers disambiguate overlapping addresses;
a processor configured to identify the second subnet for communications to a correspondent node, wherein the correspondent node includes the second subnet, and wherein the correspondent node is disjoint to the first node;
the transceiver further configured to transmit a request to the provider node, wherein the request identifies the second subnet by the address and subnet identifier associated with the second node; and
the processor further configured to establish a tunnel to the provider node, and communicate with the correspondent node using the tunnel based on policy information.

37. The apparatus of claim 36, wherein the transceiver is configured to receive the advertisement from the provider node.

38. The apparatus of claim 36, wherein the transceiver is configured to receive the advertisement in a Multi-link Subnet Interchange (MSI) system qualified network address.

39. An apparatus for use at a first node to communicate with a disjoint network, wherein the first node is in at least one of a subnet and a peer-to-peer overlay network, the apparatus comprising:
means for receiving an advertisement that advertises the accessibility of a second subnet, wherein the second network is disjoint to the first node, wherein the advertisement includes information identifying an address and a unique subnet identifier for the second subnet and information identifying a provider node, wherein unique subnet identifiers disambiguate overlapping addresses;
means for identifying the second subnet for communications to a correspondent node, wherein the correspondent node includes the second subnet, and wherein the correspondent node is disjoint to the first node;
means for transmitting a request to the provider node, wherein the request identifies the second subnet by the address and subnet identifier associated with the second node;
means for establishing a tunnel to the provider node; and
means for communicating with the correspondent node using the tunnel based on policy information.

40. The apparatus of claim 39, further comprising means for receiving the advertisement from the provider node.

41. The apparatus of claim 39, further comprising means for receiving the advertisement in a Multi-link Subnet Interchange (MSI) system qualified network address.

42. A computer program product for use at a first to communicate with a disjoint network, wherein the first node is in at least one of a subnet and a peer-to-peer overlay network, the computer program product comprising:

a non-transitory computer-readable medium comprising codes executable to:

receive an advertisement that advertises the accessibility of a second subnet, wherein the second network is disjoint to the first node, wherein the advertisement includes information identifying an address and a unique subnet identifier for the second subnet and information identifying a provider node, wherein unique subnet identifiers disambiguate overlapping addresses;

identify the second subnet for communications to a correspondent node, wherein the correspondent node includes the second subnet, and wherein the correspondent node is disjoint to the first node;

transmit a request to the provider node, wherein the request identifies the second subnet by the address and subnet identifier associated with the second node; and establish a tunnel to the provider node, and communicate with the correspondent node using the tunnel based on policy information.

43. The computer program product of claim 42, wherein the codes are configured to receive the advertisement from the provider node.

44. The computer program product of claim 42, wherein the codes are configured to receive the advertisement in a Multi-link Subnet Interchange (MSI) system qualified network address.

* * * * *